F. L. CHASE.
SPEED CHANGING MECHANISM.
APPLICATION FILED DEC. 18, 1905.
904,179.
Patented Nov. 17, 1908.
5 SHEETS—SHEET 1.
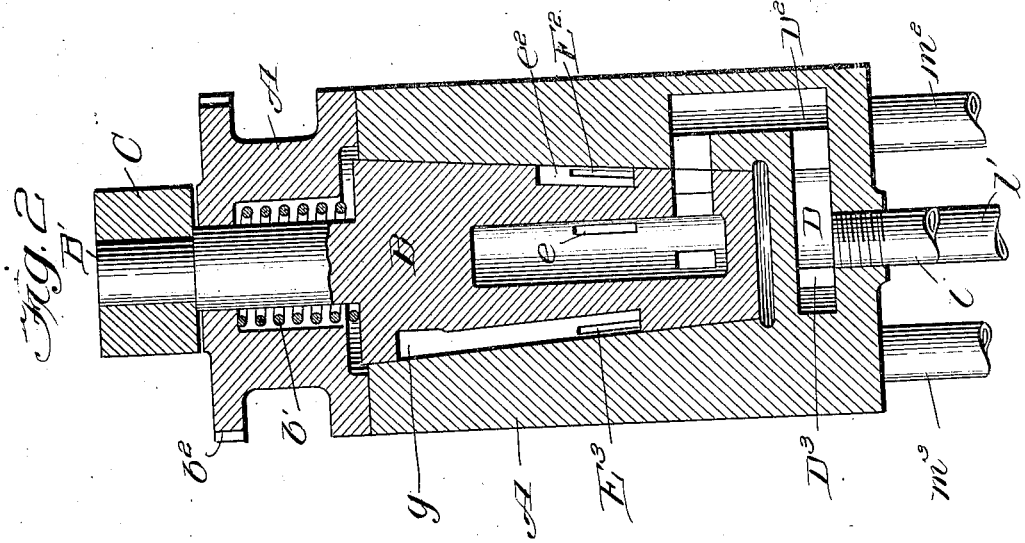
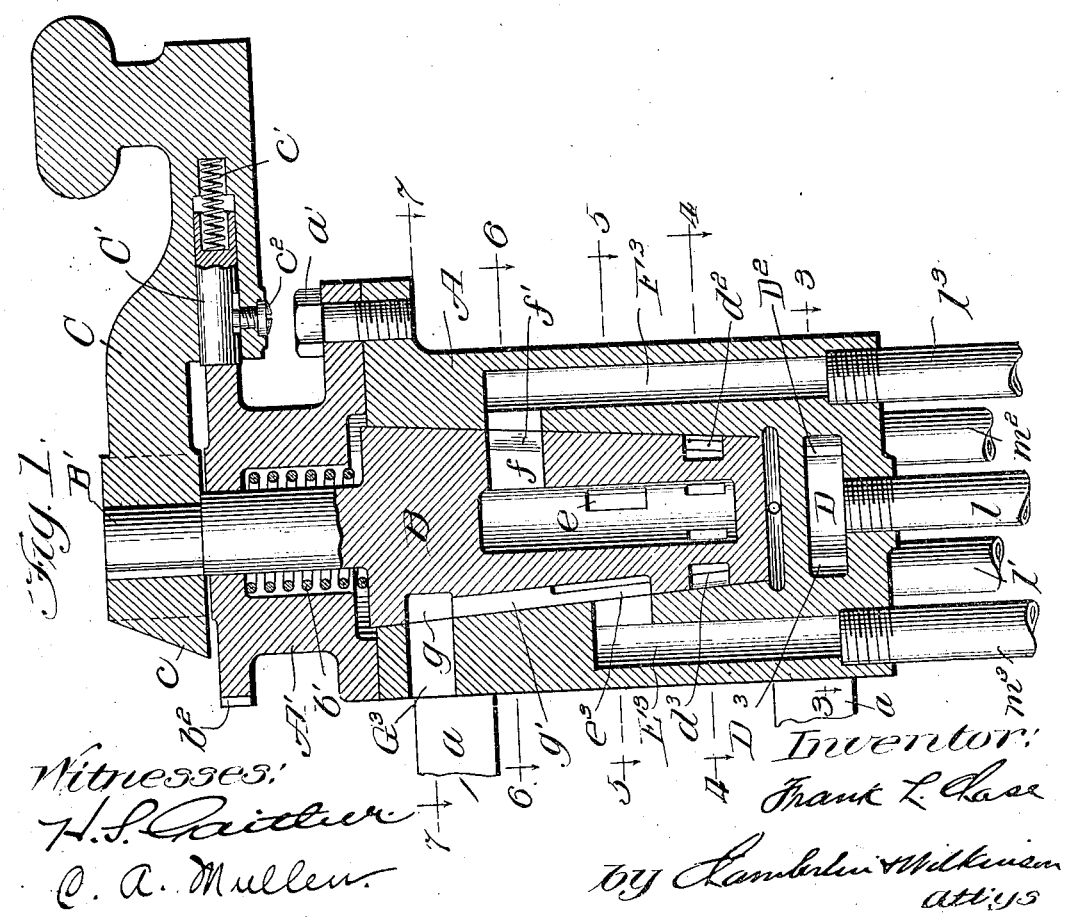
Witnesses:
H. S. Gaither
C. A. Mullen
Inventor:
Frank L. Chase
by Chamberlin & Wilkinson
att'ys

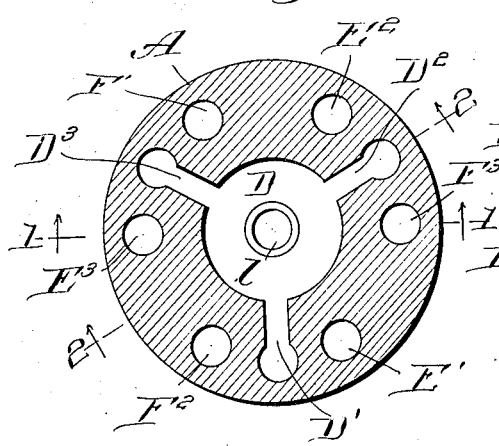
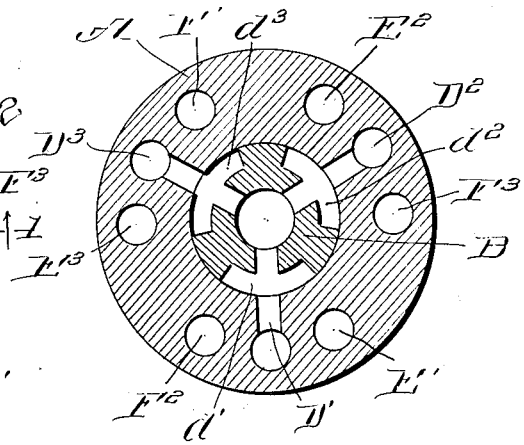
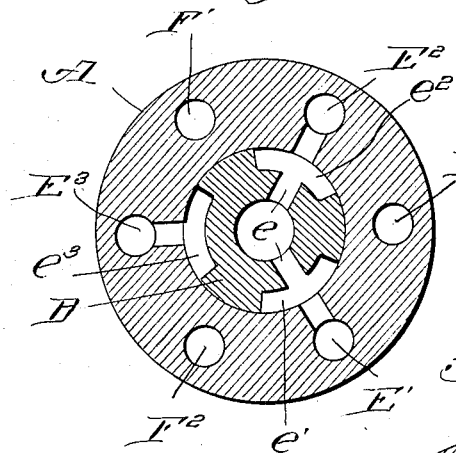
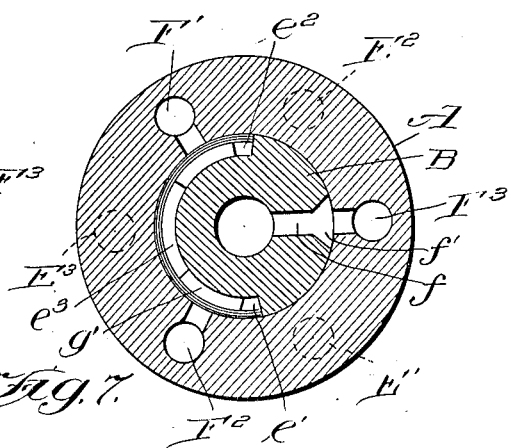
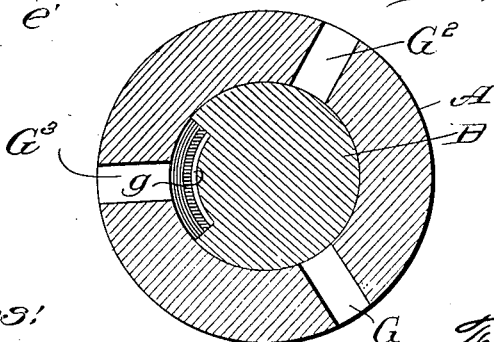

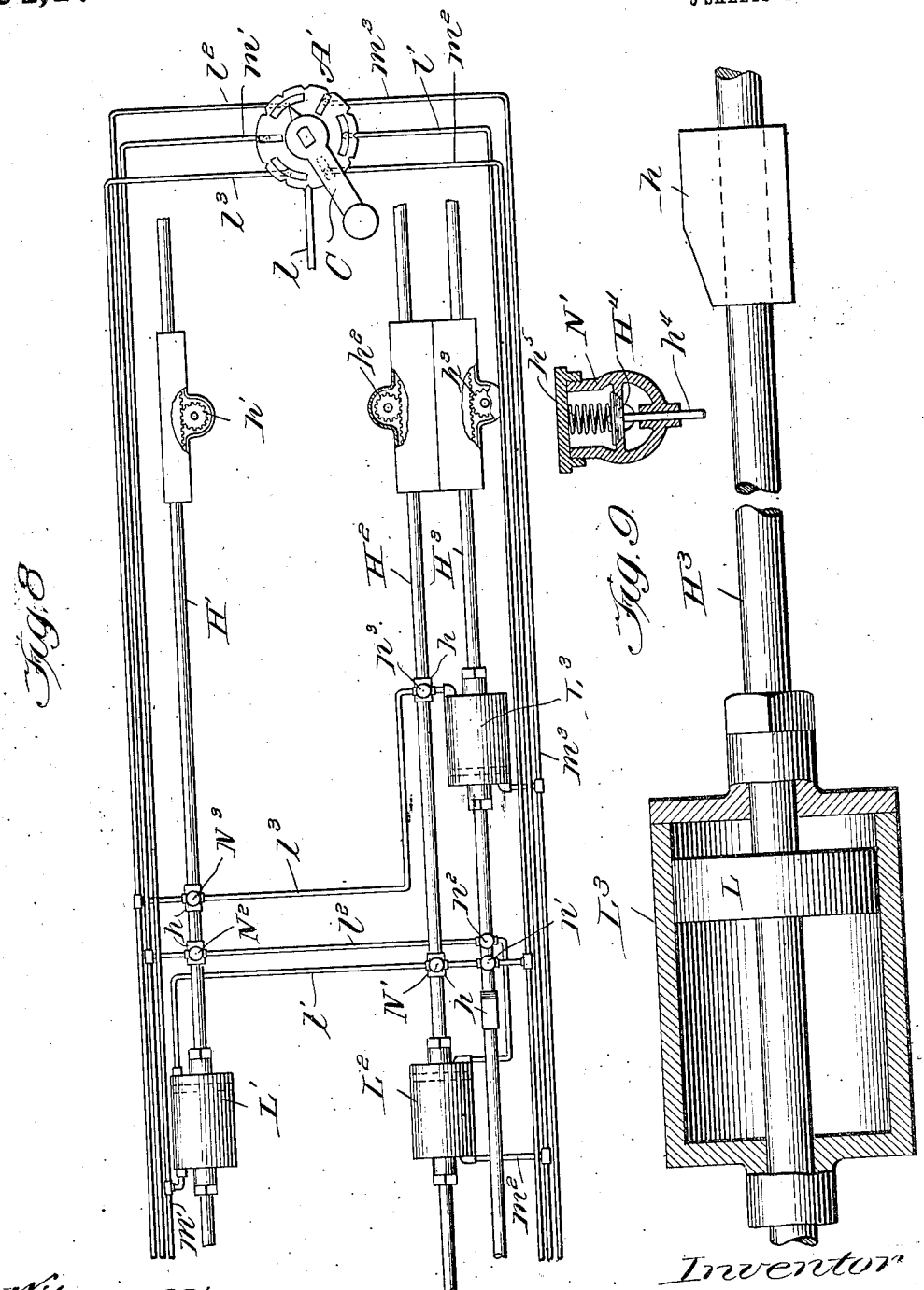

F. L. CHASE.
SPEED CHANGING MECHANISM.
APPLICATION FILED DEC. 18, 1905.
904,179.
Patented Nov. 17, 1908.
5 SHEETS—SHEET 4.
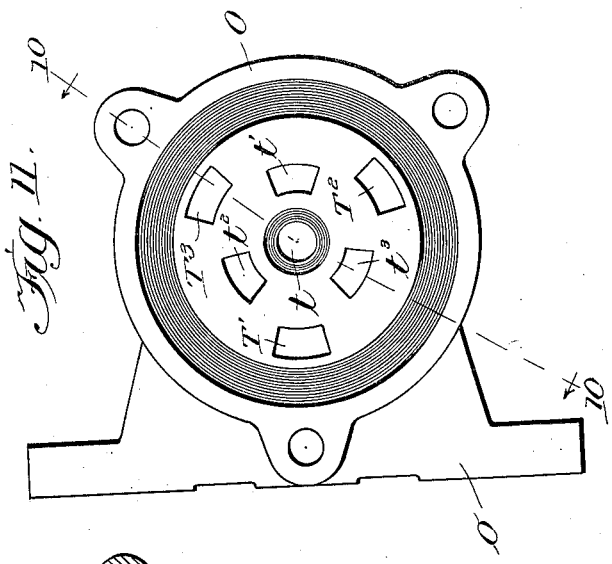
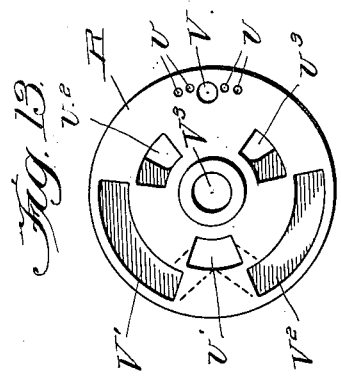
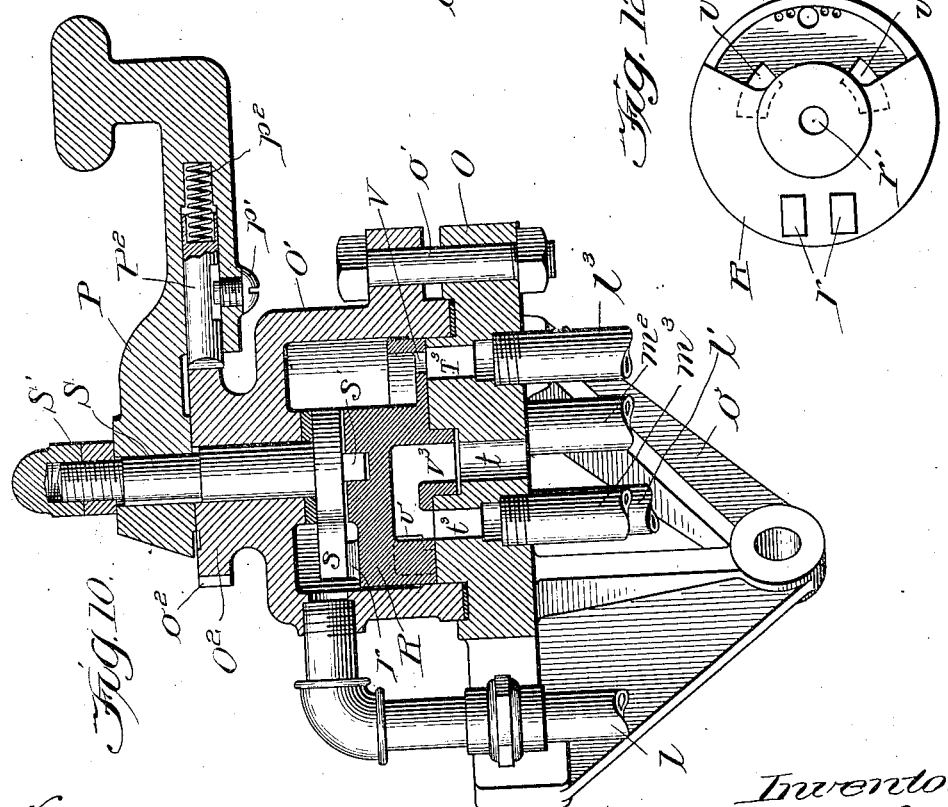
Witnesses:
Inventor:
Frank L. Chase
by Chamberlin & Wilkinson
attys

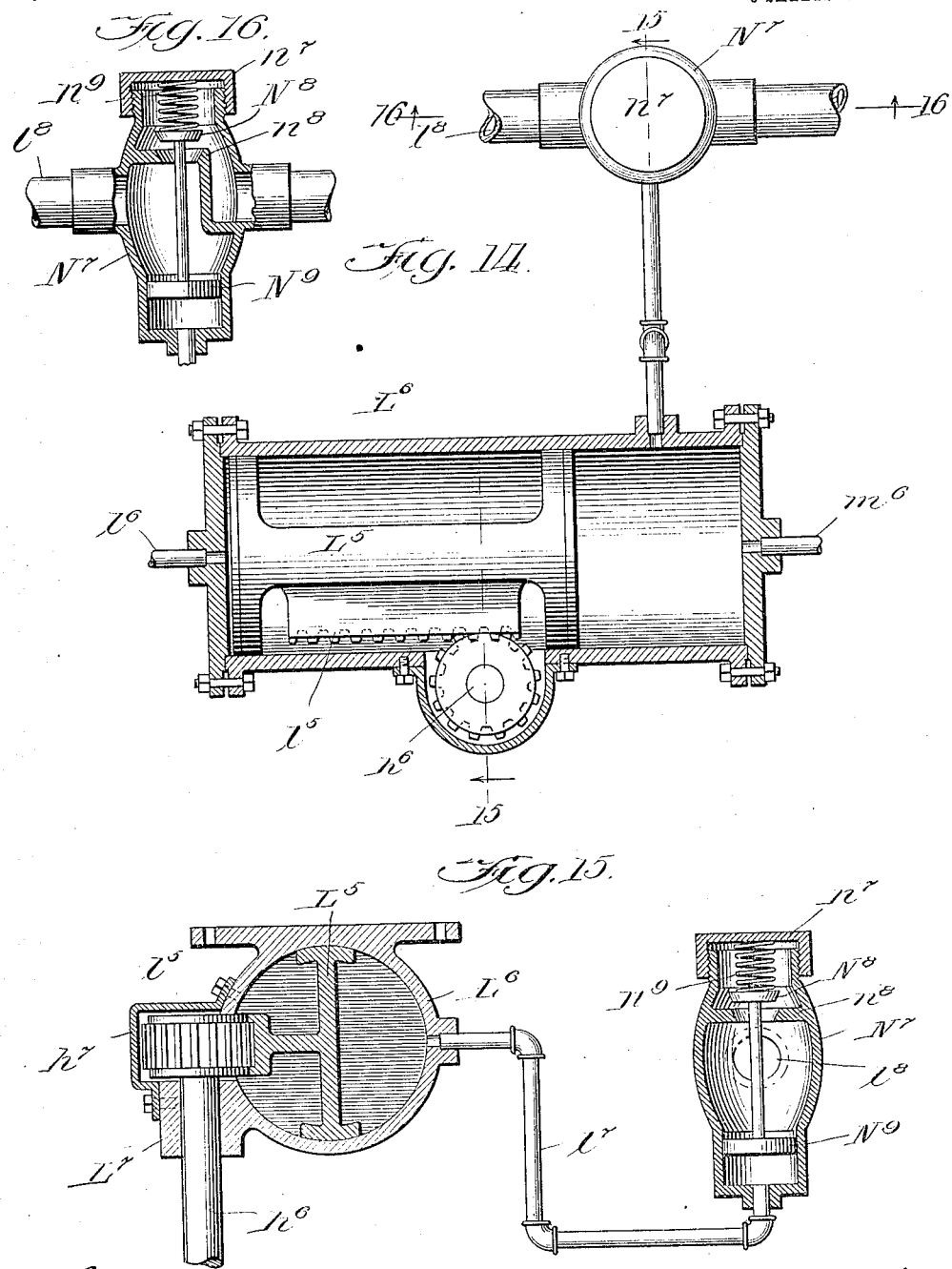

UNITED STATES PATENT OFFICE.

FRANK L. CHASE, OF JAMESTOWN, NEW YORK.

SPEED-CHANGING MECHANISM.

No. 904,179.

Specification of Letters Patent.

Patented Nov. 17, 1908.

Application filed December 18, 1905. Serial No. 292,132.

*To all whom it may concern:*

Be it known that I, FRANK L. CHASE, a citizen of the United States, residing at Jamestown, county of Chautauqua, State of New York, have invented a certain new and useful Improvement in Speed - Changing Mechanism, and declare the following to be a full, clear, and exact description of the same, such as will enable others skilled in the art to which it pertains to make and use the same, reference being had to the accompanying drawings, which form a part of this specification.

My invention relates in general to differential transmission mechanism, and more particularly to means for controlling such mechanism by compressed air, or other motive fluid.

In the operation of vehicles driven by internal combustion engines, it is customary to interpose speed changing mechanism between the engine and axle. In the case of large vehicles such as railway cars, the different speeds being best effected by clutches ordinarily actuated manually, considerable power is necessary to properly operate the clutches which severely taxes the strength of the operator. It is essential to so arrange speed changing mechanism that it will not be possible to operate simultaneously the clutches for two different speeds, as if this is possible it may happen either from carelessness or ignorance on the part of the operator that the mechanism will be broken.

The primary object of my invention is to provide means operated by compressed air or other motive fluid for controlling the clutch of a speed changing mechanism thereby relieving the operator of the vehicle from the manual work necessary to operate such mechanism by hand.

A further object of my invention is to provide means for controlling the various speeds of a motor driven vehicle in which the clutch for any speed can be actuated only when the clutches for the other speeds have been released.

A further object of my invention is to provide means for applying the speed changing clutches in a motor driven vehicle firmly yet gradually, and for effecting the release of the clutches suddenly and with full power.

A further object of my invention is to provide fluid pressure operating means for applying the speed changing clutches in a motor driven vehicle, controlled by duplicate valves at each end of the vehicle which will permit the clutches being operated by either valve when the other valve is in lap position.

A still further object of my invention is to provide apparatus for controlling the speed changing mechanism of a motor driven vehicle which will be simple in construction, comparatively inexpensive in manufacture, and efficient in operation.

The embodiment of my invention, herein disclosed, comprises a plurality of motor cylinders, pistons within said cylinders operatively connected to the clutches of the transmission mechanism for varying the speed, a controlling valve for supplying and exhausting motive fluid to and from the opposite ends of said cylinders, interlocking valves located in the pipes leading to each cylinder for intercepting the passage of air therethrough, and means for opening the valves in the pipe of one cylinder operated by the pistons in the other cylinders.

My invention will be more fully described hereinafter with reference to the accompanying drawings in which the same is illustrated as embodied in convenient and practical form, and in which,—

Figure 1 is a vertical sectional view through the controlling valve on line 1—1 Fig. 3; Fig. 2 a similar view on line 2—2 Fig. 3; Fig. 3 a horizontal sectional view on line 3—3 Fig. 1; Fig. 4 a similar view on line 4—4 Fig. 1; Fig. 5 a similar view on line 5—5 Fig. 1; Fig. 6 a similar view on line 6—6 Fig. 1; Fig. 7 a similar view on line 7—7 Fig. 1; Fig. 8 a plan view; Fig. 9 an enlarged sectional view through one of the motor cylinders and interlocking valve; Fig. 10 a vertical sectional view through a modified form of controlling valve; Fig. 11 a plan view of the valve seat shown in Fig. 10; Fig. 12 a plan view of the valve shown in Fig. 10; Fig. 13 a plan view of the under side of the valve shown in Fig. 10; Fig. 14 an enlarged sectional view through a modified form of motor cylinder and interlocking valve; Fig. 15 a sectional view on line 15—15 Fig. 14, and Fig. 16 a sectional view on line 16—16 Fig. 14.

Similar reference characters are used to designate similar parts in the several figures of the drawings.

Referring more particularly to Fig. 8, reference characters L', L² and L³ indicate motor cylinders adapted to be supported at any convenient place on a vehicle, such as a railway car driven by an internal combustion engine. H', H² and H³ indicate piston rods connected to the pistons within the cylinders L', L² and L³ respectively. The piston rods are operatively connected with suitable means for controlling the speed changing mechanism. For convenience of illustration I have shown racks carried by the piston rods which mesh with pinions h', h² and h³ respectively fixed upon posts the rotation of which operates clutches or similar devices for varying the speed of the vehicle.

The transmission mechanism and clutches coöperating therewith do not in themselves form parts of my present invention and hence they need not be illustrated or further described in this application. In a copending application filed on July 6, 1905, jointly by Bertrand M. Young and myself, Serial No. 268,465 is described the speed changing mechanism in which the posts shown in Fig. 8 are employed. It will be understood, however, that my present invention is not limited in its use to a speed changing mechanism, such as covered by the application referred to.

Leading to the right ends of the cylinders are conduits l', l² and l³ while similar conduits m', m² and m³ lead to the left ends of the respective cylinders L', L² and L³. Compressed air or other motive fluid is supplied through pipes l', l² and l³ to move the pistons in the cylinders in a direction to apply the clutches operatively connected therewith, while motive fluid is admitted through the pipe m', m² or m³ to move the piston in the communicating cylinder in a direction to release the clutch connected therewith.

In order that it may be impossible to actuate the clutch for one speed until the clutches for the other speeds have been released, two interlocking valves in each of the pipes l', l² and l³ are provided. The interlocking valves may be constructed as illustrated in Fig. 9 and are opened by cams such as shown at h secured to the piston rods. The pipe l³ for supplying motive fluid to move the piston in the cylinder L³ to actuate the high speed clutch has therein interlocking valves N³ and n³, the former of which is only unseated when the piston in the cylinder L' has been moved to release the intermediate speed clutch, while the valve n³ is only unseated when the piston in the low speed cylinder L² has been moved to release the low speed clutch. The high speed clutch consequently can be actuated only when the low and intermediate speed clutches have been released.

In a similar manner the supply pipe l' leading to the intermediate speed cylinder L' has therein interlocking valves n' N' opened by the piston rods H² and H³ when the pistons in the high and low speed cylinders have moved into position to release such clutches. Interlocking valves n² and N² are provided in the pipe l² leading to the low speed cylinder L² to actuate the low speed clutch, such valves being respectively opened by the piston rods H³ and H' when the intermediate and high speed clutches have been released.

The supply and exhaust of motive fluid through the pipes leading to the opposite ends of the cylinders are controlled by a valve such as shown in Figs. 1 to 7 inclusive, in which A indicates the valve casing in the lower end of which lead the pipes from the opposite ends of the cylinders. A pipe l also leads to the interior of the valve casing through which motive fluid is supplied, such for instance as compressed air. The compressed air is delivered to a chamber D near the lower end of the valve casing from which extend passages D', D² and D³, such passages terminating in ports as shown in Figs. 2, 3 and 4, such ports being controlled by a valve B rotatively mounted in casing A. The valve B is provided with a hollow interior to which openings extend from grooves d', d² and d³, such grooves being located in the same horizontal plane as the upper ends of the passages D', D² and D³.

The pipes m', m² and m³ communicate with upwardly extending passages within the valve casing designated by reference characters E', E² and E³. Such passages terminate in ports controlled by the valve B, the valve being provided with grooves e', e² and e³ coöperating with such ports. Passages e extend to the exterior of the valve from the grooves e', e² as clearly shown in Fig. 5.

The pipes l', l² and l³ commuicate with passages F', F² and F³, extending upwardly within the valve casing and terminating in ports in the plane indicated by the line 6—6 Fig. 1. Such ports are controlled by the valve which in such plane is provided with an extended groove f' to admit air gradually, and a passage f leading from its outer surface to its hollow interior as shown in Fig. 6.

In the plane 7—7 Fig. 1 three exhaust ports G', G² and G³ extend through the valve casing as shown in Fig. 7, such exhaust ports being controlled by a groove g in the valve B. The valve B is provided with a valve stem B' which projects upwardly through a cap A' of valve casing A. A spring b' surrounds the stem B' and bears against the top of the valve B to retain the same in close contact with the inner surface of the casing. A handle C is secured to the upper end of the valve stem by means of which the valve is rotated. A latch C' is carried by the handle and engages notches in a flange b² projecting around the cap A. A spring c' forces the latch C' into engagement with the flange b². The movement of the latch is limited by a screw c² projecting into an elongated slot in the latch as clearly shown in Fig. 1. The cap A' is secured to the casing A in any suitable manner, such for instance as by screws $a'$ extending through holes in registering ears on the cap and casing. The valve casing may be supported in any suitable manner, as for instance by brackets $a$.

The construction of the valve and valve casing is such that before motive fluid is admitted to one of the cylinders to actuate the clutch connected with the piston therein, the opposite end of such cylinder is connected with the exhaust, and the cylinders for actuating the other clutches are connected with the motive fluid on the sides of the pistons therein to release the clutches and with the exhaust on the opposite sides of their pistons. In the position shown in the figures, motive fluid passes to the chamber D in the valve casing from the supply pipe $l$ thence through the passages D', $D^2$ and $D^3$ to the grooves $d'$, $d^2$ and $d^3$, in the valve from which it passes through the communicating ports to the interior of the valve. The motive fluid passes from the interior of the valve through the ports $e$ and communicating grooves $e'$ and $e^2$ in the valve to the passages E' and $E^2$ which lead to the pipes $m'$ and $m^2$ thereby delivering motive fluid to the releasing ends of the cylinders L' and $L^2$. Motive fluid also passes from the interior of the valve through the passage $f$ to the passage $F^3$ thence through the pipe $l^3$ to the front end of the cylinder $L^3$ so that the piston therein will be moved in a direction to operate the high speed clutch. The pipes $l'$ $l^2$ leading from the front ends of the cylinders L' $L^2$ communicate with the atmosphere through the passages F' and $F^2$ in the valve casing which are connected with the exhaust port $G^3$ by the communicating grooves $g'$ and $g$ in the valve. The pipe $m^3$ also communicates with the exhaust through the passage $E^3$ in the valve casing and communicating grooves $e^3$, $g'$ and $g$ in the valve leading to the exhaust port $G^3$. In the position of the valve indicated in the drawings the piston in the cylinder controlling the high speed clutch is consequently moved in a direction to actuate said clutch while the pistons in the low and intermediate speed cylinders are moved in an opposite direction to release the clutches controlled thereby. In a similar manner by moving the valve one-third of a revolution or until the passage $f$ therein registers with the passage F' in the valve casing, the intermediate speed cylinder is supplied with motive fluid on the side of the piston therein to actuate the clutch connected thereto and the opposite side of the piston is connected with the exhaust, while the high and low speed cylinders are connected with motive fluid on the releasing sides of their pistons while the opposite sides of their pistons communicate with the exhaust. A further rotation of the valve through one-third of a revolution brings the passage $f$ into communication with the passage $F^2$ in the valve casing so that the low speed clutch will be actuated and the high and intermediate speed clutches released.

When it is desired to retain the clutches in the condition resulting from the desired movements of the pistons in the motor cylinders, the valve may be moved one-sixth of a revolution from the positions above described. A movement of the valve one-quarter of a revolution from any of the three positions for actuating one clutch and releasing the others, will release the applied clutch so that all of the clutches will be released. Such one-quarter revolution brings the groove $g'$ into register with the passage $F^3$ in Fig. 6 permitting the motive fluid to pass through such groove and the communicating groove $g$ to exhaust port $G^3$. When the valve is in position for the passage $f$ to register with either of the passages F' or $F^2$ a similar quarter rotation of the valve will bring the port previously in register with the passage $f$ into communication with the exhaust port. If desired notches may be provided in the flange $b^2$ of the cap A' of the valve casing to be engaged by the latch C' and thereby facilitate the desired movement of the valve.

In Figs. 10 to 13 inclusive I have illustrated a modified form of valve for controlling the supply and exhaust of compressed air to and from the motor cylinders for controlling the speed clutches. The valve shown in such figures differs from that shown in Figs. 1 to 7 inclusive in that it is of a disk type rather than a plug valve. Reference character O indicates the valve seat which may be conveniently supported by a bracket $o$ at one end of a car. Mounted upon the valve seat is a valve casing O' the lower end of which is preferably received within a groove in the valve seat to form an air tight joint. Any suitable means may be provided for securing the valve casing to the valve seat, such for instance as bolts $o'$ extending through alined holes in lugs projecting laterally from the valve seat and valve casing. R indicates the valve which is rotatably supported upon the valve seat and is provided with a depending circular flange engaging a circular opening in the valve seat thereby forming a center of rotation for the valve. S indicates a valve stem projecting upwardly through the valve casing O' and provided with a handle P secured thereto in any suitable manner, as for instance by lock nuts S' engaging the screw-threaded upper end of the stem. The latch $P^2$ is carried by the handle P and engages notches $o^2$ formed in the periphery of a flange $O^2$ projecting laterally around the casing. $p^2$ indicates a spring engaging the end of the latch to retain the same in engagement with the flange $O^2$. The movement of the latch is limited by a screw $p'$ projecting into an elongated slot in the latch as clearly shown in Fig. 10. The lower end of the stem S is provided with a circular lug $s'$ which engages a circular socket $r'$ in the top of the valve and is also provided with a laterally projecting flange $s$ which is received between lugs $r, r$ projecting upwardly from the valve. The valve seat is provided with a central port $t$ projecting through the same and with three ports $t'$ $t^2$ and $t^3$ located concentrically around the central port $t$. The pipes $m', m^2$ and $m^3$ leading from the ends of the cylinders for releasing the clutches communicate with the respective ports $t', t^2$ and $t^3$. Ports $T', T^2$ and $T^3$ extend through the valve seat $O$ and are located concentrically around the central port $t$ but at a greater distance therefrom than the ports $t', t^2$ and $t^3$. The pipes $l'$ $l^2$ and $l^3$ leading from the ends of the cylinders for operating the clutches for the several speeds communicate with the ports $T', T^2$ and $T^3$. The ports $t', t^2$ and $t^3$ are spaced equal distances apart and are staggered with relation to the ports $T', T^2$ and $T^3$ which are also located equal distances apart. The underside of the valve R is provided with two grooves $V', V^2$ therein which communicate by passages formed in the valve with a port $v'$ located in position to coöperate with the ports $t', t^2$ and $t^3$ of the valve seat. A passage leads from the port $v'$ to the exhaust port $V^3$ at the center of the valve. The valve is also provided with two ports $v^2$ and $v^3$ which extend through the valve as shown in Fig. 12. The ports $v', v^2$ and $v^3$ are spaced equal distances apart while the ports $V'$ and $V^2$ are located nearer the outer periphery of the valve and occupy positions in alinement with the spaces between the ports $v'$ and $v^2$ and $v'$ and $v^3$ respectively. A port V extends through the valve at a distance from the center thereof corresponding to the positions of the ports $T', T^2$ and $T^3$ in the valve seat. At each side of the port V are smaller ports $v$. The pipe $l$ for supplying compressed air for the movement of the pistons within the motor cylinders communicates with the interior of the valve casing as shown in Fig. 10.

The operation of the valve is as follows: When it is in the position shown in Fig. 10, compressed air is supplied through the port V to the pipe $l^3$ leading to the end of the cylinder $L^3$ for applying the high speed clutch. When the valve is in this position compressed air is also supplied through the ports $v^2$ and $v^3$ and registering ports $t'$ and $t^2$ to the pipes $m'$ and $m^2$ leading to the ends of the cylinders $L', L^2$ for releasing the slow and intermediate speed clutches. The port $V'$ and $V^2$ in the valve connect the ports $T'$ and $T^2$ with the exhaust through the passage in the valve leading to the exhaust port $V^3$ while the port $v'$ in the valve connects the port $t^3$ with the exhaust thereby connecting the pipes $l', l^2$ and $m^3$ with the atmosphere.

When it is desired to operate the intermediate speed clutch, the valve is rotated to such a position that the port V registers with the port $T'$ in which position compressed air will be supplied to the pipes $l', m^2$ and $m^3$ while the pipes $m' l^2$ and $l^3$ will be connected with the exhaust. To operate the low speed clutch the valve is rotated to a position in which the port V registers with the port $T^2$ in the valve seat in which position compressed air will be supplied to the pipes $l^2$, $m'$ and $m^3$ while the pipes $m^2, l'$ and $l^3$ will be connected with the exhaust.

It will be noticed that the relative positions of the ports in the valve and valve seat are such that compressed air will be supplied to the release sides of the clutch pistons before it will be applied to the side of the piston to apply the desired clutch and that by reason of the restricted ports $v$ at either side of the large port V the compressed air will be gradually supplied to actuate the desired clutch. The valve may be rotated in either direction and may be rotated so as to close all of the ports in the valve seat thereby permitting the valve at one end of the car to be inoperative when the valve at the other end of the car is to control the clutches.

In Figs. 14 and 15 I have illustrated a modified form of motor cylinder for actuating the clutches in which $L^6$ indicates the cylinder which may be secured by laterally projecting flanges shown in Fig. 15 to the car or to the truck frame. $m^6$ indicates the pipe for supplying compressed air to the end of the cylinder to release the clutch, while $l^6$ indicates the supply pipe for compressed air to apply the clutch. The clutch is operated by means of a rack $l^5$ carried by the piston which meshes with the pinion at the upper end of the post $h^6$ which controls the clutch connected thereto. $L^7$ indicates a bearing carried by the cylinder through which the post $h^6$ extends, while $h^7$ indicates a housing carried by the cylinder for inclosing the pinion at the upper end of the post. A motor cylinder constructed as shown in Figs. 14 and 15 renders it unnecessary to employ rods extending longitudinally of the car interposed between the pinions at the upper ends of the posts for actuating the clutches and the pistons in the cylinders. As the piston rods are dispensed with in motor cylinders constructed as shown in Figs. 14 and 15, an interlocking valve such as shown in these figures controlled by compressed air is provided. $N^7$ indicates the valve casing within which is a valve seat $n^8$ the opposite sides of which lead to sections of the pipe $l^8$ for supplying compressed air to the end of another motor cylinder. $N^8$ indicates a valve coöperating with valve seat $n^8$ provided with a depending valve stem secured to a piston $N^9$. $l^7$ indicates a pipe leading from the cylinder $L^6$ to the lower end of the valve casing below the piston. $n^9$ indicates a spring for normally seating the valve $N^8$ while $n^7$ indicates a cap closing the upper end of the casing.

The operation of the interlocking valve shown in Figs. 14 and 15 is as follows: When the piston within the cylinder $L^6$ is moved towards the left in Fig. 14 to disconnect the clutch actuated thereby, the end of the pipe $l^7$ is uncovered so that compressed air passes through the same to the underside of the piston $N^9$ thereby lifting the valve $N^8$ away from its seat against the tension of the spring $n^9$. Compressed air then may pass through the pipe $l^8$ to the end of the cylinder with which it communicates for actuating the clutch connected thereto. It would be of course understood that each motor cylinder will control an interlocking valve in the supply pipe leading to each other cylinder so that compressed air may be admitted to apply the clutch for one speed only when the clutches for the other speeds have been released.

From the foregoing description it will be observed that I have invented an improved system for controlling the various speeds of a vehicle by motive fluid. It will be further observed that in my system only one of the clutches which control the various speeds may be operated at a time and only when all of the other clutches are released. It will be also evident that in my improved system for controlling the speed of a vehicle the valve can be operated in either direction so as to apply and release the various speed clutches in any order desired and that the valve may be left on lap between the positions for the various speeds so that a valve may be employed at each end of the vehicle either one of which, however, may be operated to control the clutches.

Having now fully described my invention what I claim as new and desire to secure by Letters Patent is:

1. The combination with a plurality of motor cylinders, of pipes for supplying motive fluid to the opposite ends of said cylinders, a valve casing with which said pipes communicate, a valve within said casing, said valve and casing having coöperating ports and passages for simultaneously supplying motive fluid to one end of one of said cylinders and to the opposite ends of the other of said cylinders and coincidently connecting with an exhaust port the ends of said cylinders to which motive fluid is not supplied.

2. The combination with a plurality of movable members, motor cylinders, pistons within said cylinders, means connecting said pistons to said mechanism for varying the speed of the vehicle pipes leading to said cylinders, a valve casing with which said pipes communicate, a valve within said casing having passages for separately supplying motive fluid to said cylinders, and interlocking devices for preventing the supply of motive fluid to more than one of said cylinders.

3. The combination with a plurality of motor cylinders, separate passages leading to the ends of each of said cylinders for supplying fluid thereto, separate pipes leading to the other ends of said cylinders for supplying motive fluid thereto, a valve casing with which said pipes communicate, a valve within said casing for simultaneously supplying motive fluid through one of said first pipes to one of the cylinders, and through the other pipes to the other of said cylinders, and coincidently connecting the remaining pipes with an exhaust port.

4. The combination with a plurality of movable members, of motor cylinders which control said members, separate pipes leading to the ends of each of said cylinders for supplying fluid for moving the pistons therein to actuate said members, separate pipes leading to the other ends of said cylinders for supplying motive fluid to cause the said members to return to their normal positions, means for simultaneously supplying motive fluid through one of said first pipes to one of the cylinders, and to the other cylinders through said second pipes, and means for preventing the simultaneous supply of motive fluid through more than one of said first pipes.

In testimony whereof, I sign this specification in the presence of two witnesses.

FRANK L. CHASE.

Witnesses:
 WILSON C. PRICE,
 CHARLES S. TRACE.